Patented June 16, 1942

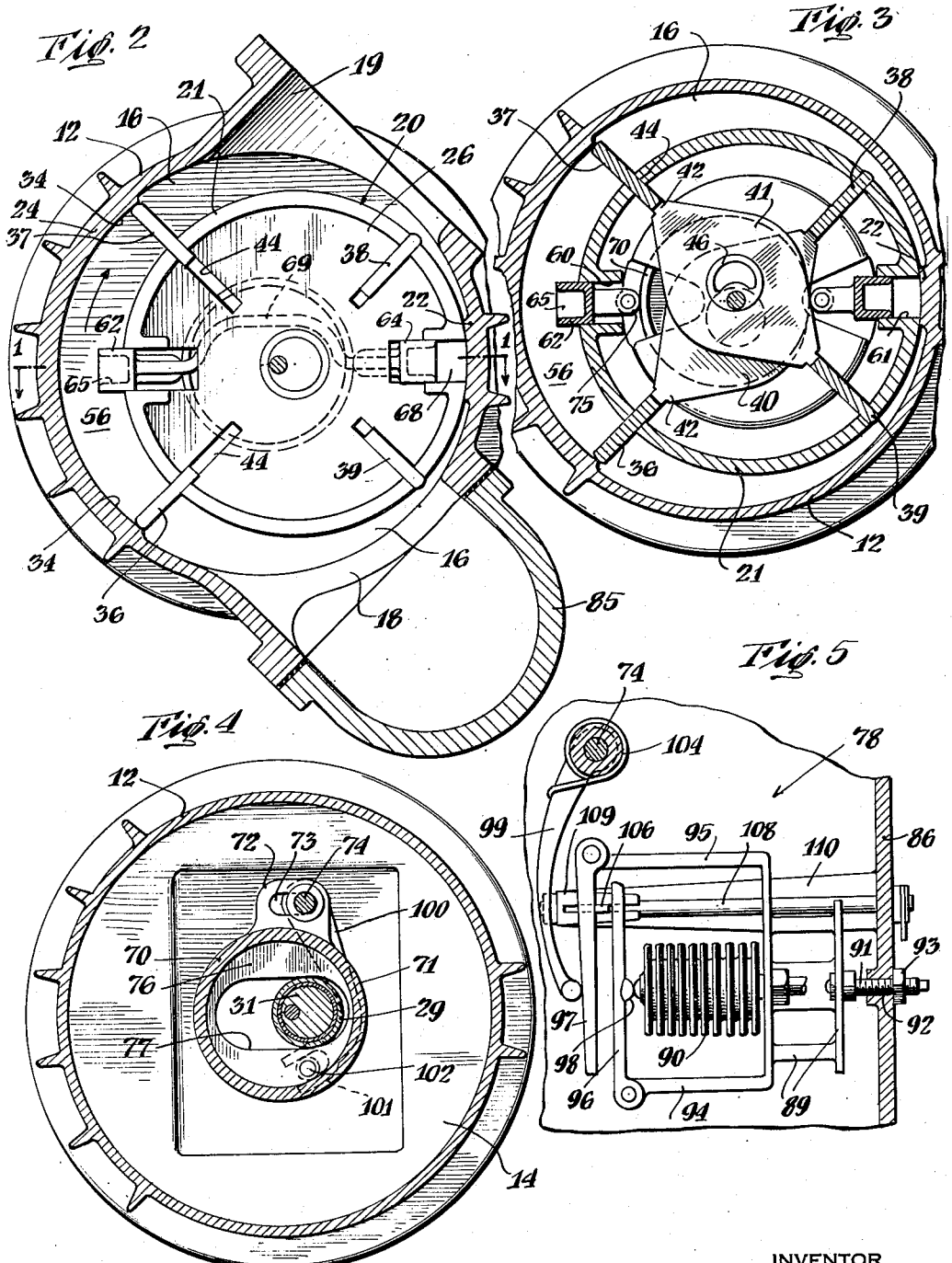

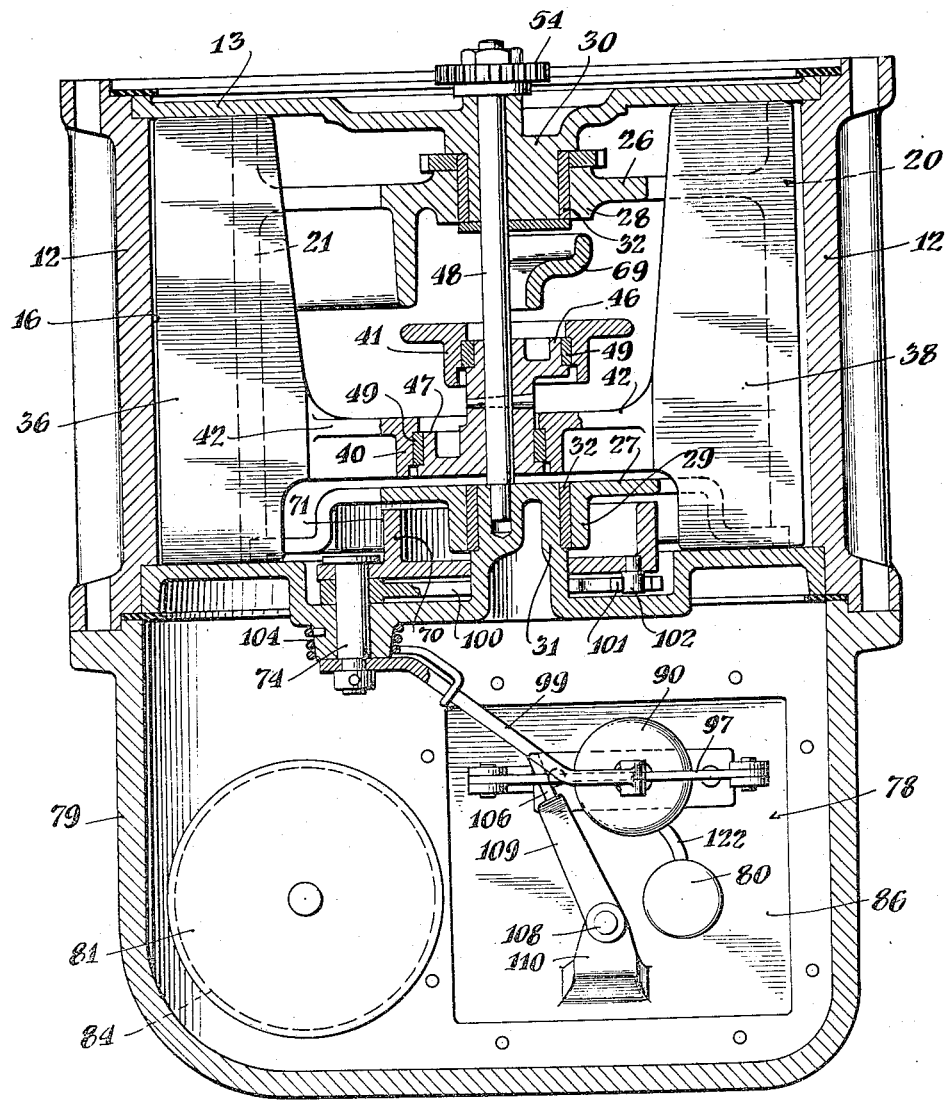

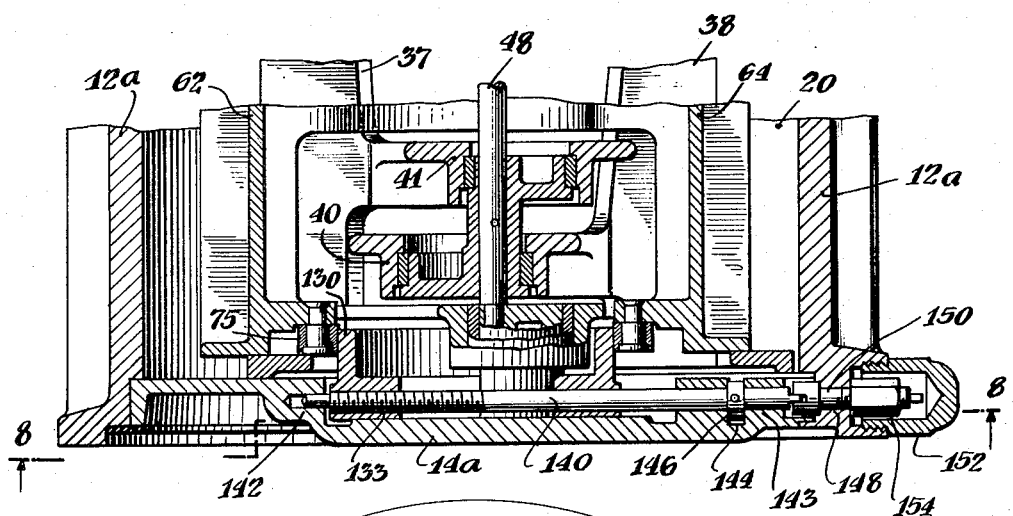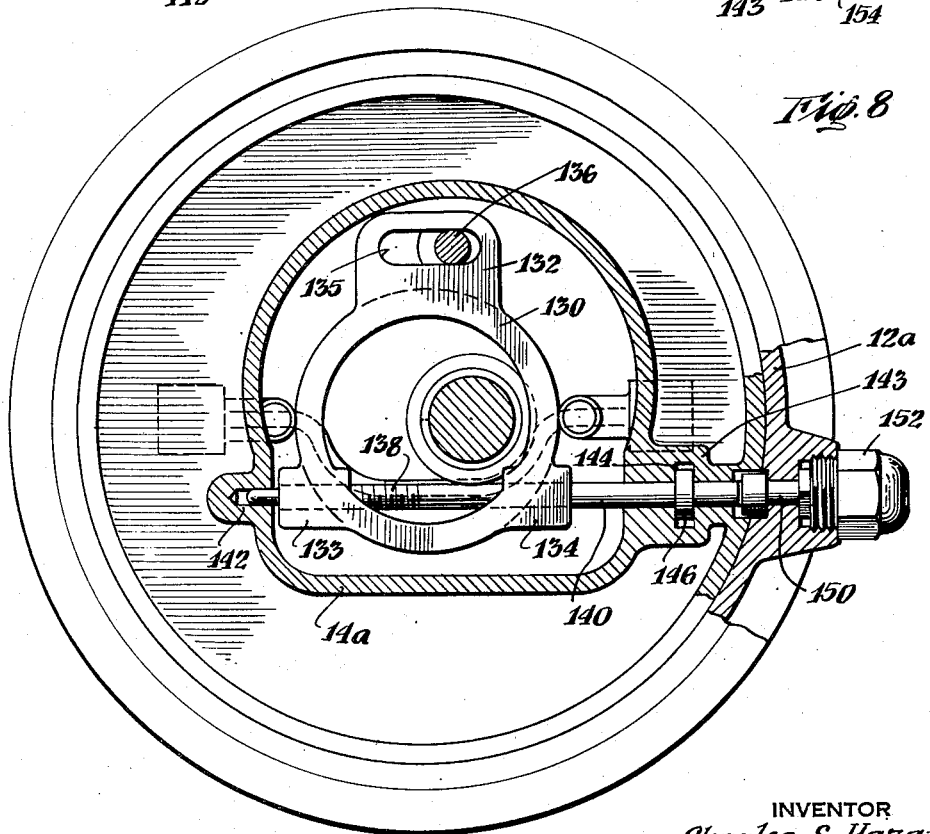

2,286,411

UNITED STATES PATENT OFFICE 2,286,411

ADJUSTABLE ROTARY METER WITH COMPENSATING DEVICE

Charles S. Hazard, Andover, N. J., assignor to Neptune Meter Company, a corporation of New Jersey Application June 1, 1940, Serial No. 338,305

19 Claims. (Cl. 73—259)

This invention relates to meters for measuring the volume of liquid or other fluid and more particularly to meters provided with means for controlling the effective capacity of a meter for a given metering operation.

One of the objects of my invention is to provide a meter with means for compensating for volumetric changes in the fluid being measured due to the contraction of expansion of the fluid at temperatures different from a predetermined or standard temperature.

Another object of the invention is to provide a meter with means for automatically effecting compensation in the amount of fluid delivered by a meter at temperatures different from a predetermined standard and readily adaptable to different fluids having different coefficients of expansion.

A further object of the invention is to provide a meter of the rotary cylinder type with one or more meter capacity compensating elements together with means for manually or automatically adjusting the compensating effect thereof.

A still further object of the invention is to provide means for adjusting the capacity of a meter to correspond with the operation of a register driven thereby.

The above mentioned and additional objects and features of the invention are obtained by providing a meter with one or more capacity variating or volume compensating elements which may be either manually or automatically adjusted for a given temperature or temperature range and for the value of the coefficient of expansion of the particular fluid being measured. More particularly, the invention includes an arrangement of the variating or volume compensating elements that adjusts the capacity of the measuring chambers in accordance with variations in the volume of a given quantity of fluid due to differences in temperature. The capacity of the meter for a given metering operation or cycle may thus be increased or decreased, whichever is desired. According to one embodiment, this is accomplished by arranging compensating elements for positioning inwardly and outwardly of the fluid measuring spaces or pockets, according to the degree of variation desired.

Each compensating element is associated with a movable or other working part of the meter for movement into compensating position as the measuring pocket is formed and held in that position until the pocket is opened for discharge. These elements also function to provide adjustable return pockets to further vary the metering capacity of the meter. The compensating elements are manually adjusted to compensate the delivery of the meter in accordance with the register readings for fluid at a predetermined temperature, and in one embodiment of the invention the elements are provided with temperature responsive means to further vary the positioning or operation of the elements to compensate for volumetric changes due to variation of heat content or temperature of the fluid being measured. The manual setting and automatic control of the compensating elements comprises the provision of an eccentric which is adjustable to increase or decrease the eccentricity thereof relative to the moving or working part of the meter. Since different fluids usually have different coefficients of expansion, the temperature responsive device is also provided with means for adjustment in accordance with the coefficient of expansion of the particular fluid being measured.

For a better understanding of the invention, reference is had to the following detailed description to be read in connection with the accompanying drawings, in which:

Figure 1 is a vertical sectional view, taken substantially along line 1—1 of Figure 2, of a meter of the rotary cylinder type provided with one of the embodiments of the present invention;

Figures 2, 3 and 4 are sectional views taken substantially along lines 2—2, 3—3 and 4—4, respectively, of Figure 1;

Figure 5 is a view in plan of a temperature responsive mechanism taken substantially along line 5—5 of Figure 1;

Figure 6 is a vertical sectional view taken substantially along line 6—6 of Figure 1;

Figure 7 is a vertical sectional view of the lower portion of the meter substantially as shown in Figure 1 provided with a form of manual adjustment for the compensating elements of the invention, and Figure 8 is a sectional view taken substantially along line 8—8 of Figure 7.

Figure 1:
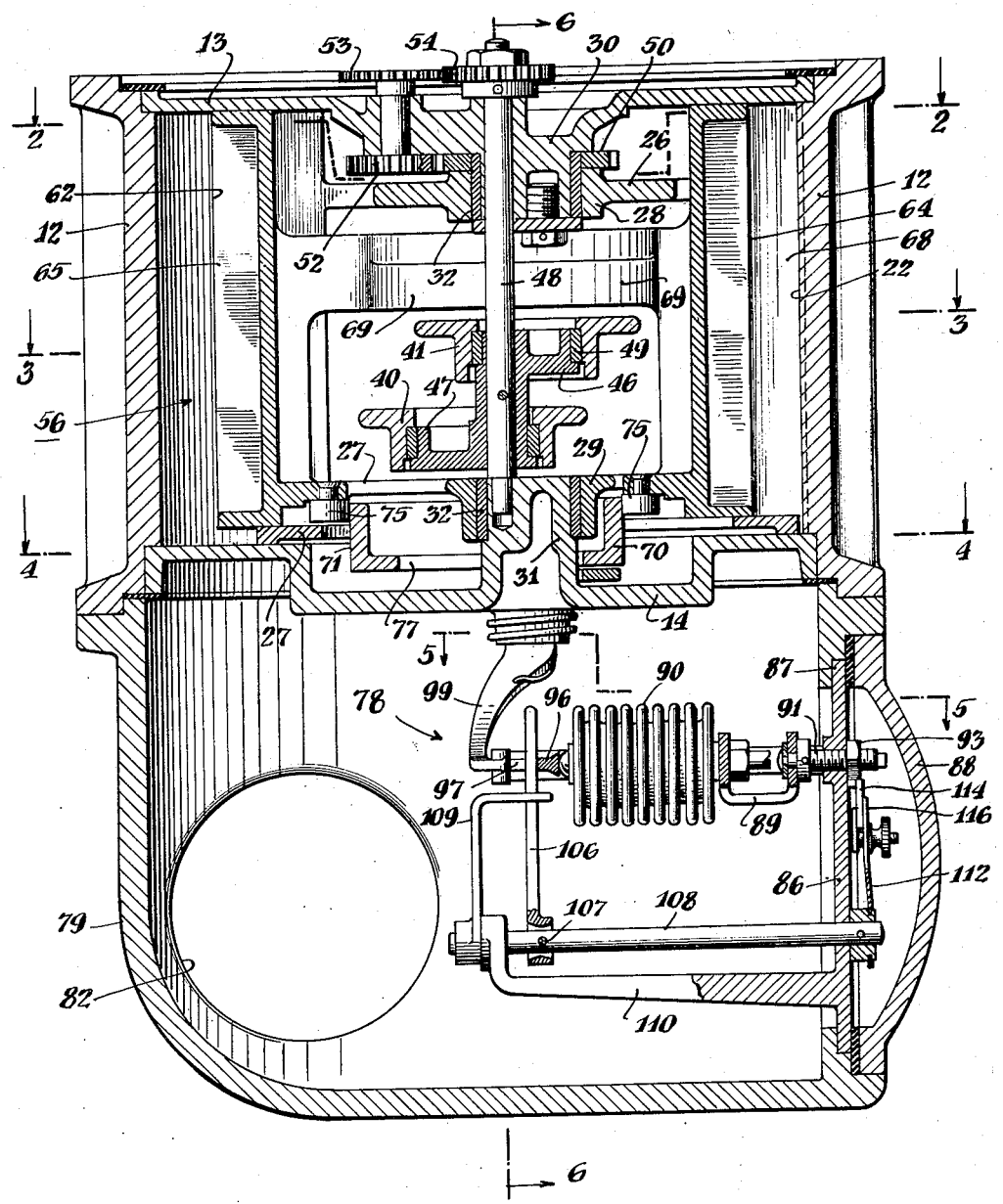

Referring to Figs. 1 to 6 of the drawings, the form of meter chosen for the purpose of illustrating the features of my invention comprises a casing 12 provided with end plates 13 and 14 to form a chamber 16 having an inlet 18 and an outlet 19. A rotor 20 is mounted within the chamber 16 and is provided with a cylindrical body portion 21 disposed in sealing relation with a portion 22 (Figs. 2 and 3) of the walls of the chamber. The opposite wall 24 of the chamber is spaced from the cylindrical body 21 to provide a passage for the flow of liquid or other fluid to be measured from the inlet to the outlet. The rotor is formed with end members 26 and 27 (Figs. 1 and 6) suitably secured to or integral with the cylindrical body portion 21 and provided with hub portions 28 and 29 which surround bosses 30 and 31 respectively. The hub portions 28, 29 are provided with suitable bearings 32 to permit the rotor to revolve easily under the action of the fluid being measured.

The wall portion 24 (Figs. 2 and 3) which is spaced from the rotor 20 is formed with a sealing surface 34 with which a series of members 36, 37, 38 and 39, carried by the rotor 20, are brought into sealing relation as the rotor revolves. The movable members are in the form of slidable vanes, four of which are shown for cooperation with the sealing surface 34 to successively form pockets for controlled passage of liquid between the inlet and outlet openings. At least one of the vanes is always in sealing relation with the sealing surface as the rotor revolves.

The vanes are formed in pairs 36, 38 and 37, 39 and extend in opposite directions from supporting collars 40, 41 (Figs. 3 and 6) to which they are connected by webs 42. The vanes are slidable in slots 44 provided in the rotor 20 and are arranged to move radially with respect to the rotor from a position in which the end of one vane is substantially flush with the circumference of the cylindrical body 21 and the other vane is projected into sealing relation with the sealing surface 34, to an opposite position in which the vane previously projected is retracted and that previously retracted is projected. As shown, adjacent vanes extend at right angles to each other so as to successively form liquid measuring pockets as the rotor revolves.

The actuating means for the vanes illustrated comprise oppositely extending eccentrics 46 and 47 secured to a drive shaft 48 by which suitable registering or recording mechanism (not shown) may be actuated. The shaft 48 is mounted for rotation in bosses 30 and 31, but is located eccentric to the axis thereof. Suitable bearings 49 are interposed between the eccentrics 46 and 47 and their respective supporting collars 40 and 41. The shaft 48 and the eccentrics 46 and 47 are driven from the rotor 20 from a gear 50 carried by the end member 26 through a chain of gears 52, 53 and 54.

While the meter is intended to be driven by the force of the incoming fluid against the vanes, it is also recognized that the meter may be driven by auxiliary power to provide a pumping action as well.

During metering operation, the fluid passes from the inlet 18 to the outlet 19 through the space between the rotor 20 and the sealing surface 34. As the vane 36 moves into sealing relation with the surface 34 it forms together with the adjacent vane 37 a pocket 56 which provides for the effective measurement of fluid flowing through the meter. Shortly after the engagement of the vane 36 with the surface 34, the vane 37 breaks the sealing engagement with the surface 34 to permit discharge of the amount of fluid contained in the pocket 56. As the vanes approach the wall portion 22, the eccentrics operate to retract the vanes to a position with the ends of the vanes substantially flush with the periphery of the rotor 20. Thus, by means of the four vanes of the meter illustrated, a certain number of fluid measuring pockets are established and disestablished during a given metering operation or cycle. For example, for each rotation of the rotor 20, four pockets are provided for measured delivery of fluid.

Referring now to the compensating feature of my invention, reference being had to Figs. 1 to 3 of the drawings, the rotor 20 is provided with elongated openings 60 and 61 in opposite sides thereof within which piston-like elements 62 and 64 are arranged for movement radially of the rotor. These elements or pistons 62 and 64 are shown as recessed at 65 to reduce the weight thereof.

During metering operation, the pistons 62 and 64 are adapted to assume the full extent of one of their positions at substantially the time an associated pocket is completely established, such as when the vane 36 is just brought into sealing engagement with the surface 34. Each piston operates twice during a rotation to vary the capacity of the meter, once to change the capacity of the pocket 56 and again to provide a return pocket 68 as the piston is retracted into the rotor as it passes the sealing portion 22. Since the pistons 62 and 64 each operate to change the delivery capacity of the meter, the total compensating effect per rotation of the rotor is equal to four times the amount displaced within the pocket 56 by one piston. This feature of my invention, as is readily apparent, provides for a wide degree of meter capacity compensating adjustment.

The radial positioning of the pistons 62 and 64 during rotation of the rotor 20 is controlled by a device 70 which is provided with a cylindrical outer bearing surface 71 that is adjustable eccentrically with respect to the axis of the rotor. The device 70 has a laterally extended portion 72 containing a slot 73 through which a pin 74 extends. The device 70 also has a flange 76, which is provided with an elongated opening 77 substantially parallel to the slot 73 to receive the boss 31. The device 70 is thus provided for adjustment to various angles and directions about the boss 31 so as to vary the eccentricity of the surface 71.

A bar 69 suitably shaped for clearance during operation, interconnects the pistons 62 and 64, the pistons each being provided with a roller 75 for operative engagement with a diametrically opposite portion of the surface 71. Should the cylindrical bearing surface 71 be adjusted to a position concentric of the axis of the rotor, the piston elements 62 and 64 would remain stationary with respect to the rotor, but should the bearing surface 71 be adjusted eccentrically with respect to the axis of the rotor, the pistons would then operate to provide meter capacity compensating effect, the degree of which would depend upon the eccentricity of the surface 71.

The adjustment of the device 70 may be effected either manually or automatically in response to the operation of a temperature responsive device associated with the fluid being measured. In Figures 1, 4 and 5 a temperature responsive mechanism 78 is shown to illustrate a form of automatic adjustment means.

The temperature responsive mechanism 78 is contained within a chamber provided by a casing 79 connected to or forming an extension of the casing 12 of the meter to provide an enclosed space through which the fluid is led to the meter and in the course of its travel therethrough is caused to contact with a thermal bulb 80 of the temperature responsive mechanism. The casing 79 is shown as provided with an inlet 81 and an outlet 82, the usual filter being provided as indicated at 84. The outlet 82 is shown as connected to the inlet 18 of the casing 12 by a conduit 85 which may be an integral part of the casing 79 or suitably secured thereto.

The temperature responsive mechanism 78 is shown in Figs. 1 and 5 as mounted upon a plate 86 which is received in operative position in an opening 87 of the casing 79 and covered by an outer plate 88. A Sylphon bellows 90 is suitably mounted upon a bracket 89 which is supported on the plate 86 by a bolt 91 threadably received in an opening 92. The bolt 91 is provided with a nut 93 to retain the temperature responsive mechanism in adjusted position with respect to the plate 86. The bracket 89 is provided with extensions 94 and 95, which provide oppositely disposed pivots for a pair of levers 96 and 97. The lever 96 is adapted to contact at 98 with the free end of the bellows 90. The lever 97 engages an arm 99 keyed to the pin 74 which, in turn, is keyed to an arm 100 forked at 101 to receive a roller 102 carried on the device 70 at a position substantially 180° from the slot 73 (Figs. 4 and 6). A spring 104 is associated with the arm 99 to maintain the arm in biased position against the lever 97.

For the purpose of providing for the coefficient of expansion of different fluids to be measured, an adjustment is provided which includes a spacer bar 106 adapted to operatively connect the levers 96 and 97. The spacer bar 106 is pivotally connected by a pin 107 to a shaft 108 for pivot movement axially of the shaft, the bar being guided and maintained in adjusted relation by a forked member 109 also carried by the shaft 108. One end of the shaft 108 is supported on a bracket 110 while the other end extends through the plate 86 for connection with a manually actuatable arm 112.

A graduated dial 114 mounted upon the plate 86 cooperates with an index pointer 116 to indicate the adjustment for coefficient of expansion.

The thermal bulb 80 is provided with a suitable tube 122 for connection to the bellows 90 and for advantageously positioning the bulb in the fluid stream.

Upon installation of the temperature responsive mechanism, the bracket 89 may be adjusted relative to the plate 86 by means of the bolt 91 so as to regulate the positioning of the compensating pistons 62 and 64 in accordance with the registering device with which the meter is associated, the adjustment also being made in accordance with a selected or standard temperature. When the meter is to be used for measuring a particular fluid, the arm 112 may be moved to an index position corresponding to the coefficient of expansion of the fluid, the position of the spacer 106 being thereby adjusted for proper metering for that particular fluid. During changes in temperature of the fluid, the bellows 90 expand or contract, as the case may be, to pivot the lever 96 for movement against the spacer 106. The position of the spacer 106 lengthwise of the levers 96, 97 determines the leverage thereof, the further the spacer 106 is adjusted toward the bracket extension 95 the greater the leverage, and vice versa, the nearer the spacer is moved toward the extension 94 the smaller the leverage. This arrangement affords a great latitude of adjustment for fluids having widely different coefficients of expansion.

The expansion and contraction of the bellows 90 is transmitted to the arm 99 through the levers 96, 97 and thence to the arm 100 to effect the eccentric positioning of the device 70. The spring 104 maintains the arm 99 in biased relation against the lever 97 so that should the bellows 90 contract, the spring is sufficiently strong to adjust the eccentricity of the device 70 in accordance with the contraction of the bellows.

The temperature responsive operation of the mechanism 78 is therefore transmitted in accordance to the coefficient of expansion of the fluid being measured directly to the pistons 62 and 64 through the eccentrically adjustable device 70 whereby compensating effect of the pistons 62 and 64 is determined in accordance with changes in temperature of the fluid being measured.

Since meters are often purchased for use with one kind of fluid only, and at substantially the same temperature and pressure, it is not always necessary to provide a temperature responsive mechanism for automatically adjusting the compensating elements. It is, however, important to provide a means for manually setting the compensating elements to give the correct registering reading for the volume of the fluid to be measured.

I therefore show in Figs. 7 and 8 a simplified form of means for manually adjusting the compensating elements 62 and 64. In this embodiment, the adjustable eccentric is shown in the form of an annular device 130 having suitable mounting extensions such as the member 132 and the bosses 133 and 134. The member 132 is provided with a slot 135 which receives a stationary pin 136. The boss 133 is threaded to receive the threaded portion 138 of a shaft 140 which extends through the boss 134. The inner end of the shaft 140 is received in a bearing 142 while the opposite end of the shaft is received in a bearing 143, the bearings being formed in the bottom plate 14a. The bearing 143 is provided with an enlarged recess 144 to receive a collar 146 secured to the shaft 140 to maintain the shaft against axial movement. The wall of the casing 12a is provided with an opening 148 through which a key 150 extends to grip the end of the shaft 140 for adjustment purposes, the key normally being enclosed by a cap 152.

For adjustment purposes, the cap 152 is removed, the nut 154 retracted and the key turned to provide for the necessary adjustment. Rotation of the shaft 140 operates to threadably move the device 130 axially of the shaft 140 and thereby eccentrically with respect to the axis of the rotor 20. Changes in the eccentricity of the device 130 operate the same as changes in the eccentricity of the device 70 of the form shown in Figs. 1 to 6 to increase or decrease, as the case may be, the amount of compensation provided for by operation of the pistons 62 and 64.

While I have shown and described two forms of the invention, it will be understood that many other modifications thereof may be made without departing from the spirit of the invention; that one, two or more compensating piston elements may be provided; that the shape and arrangement of the compensating elements may be greatly changed; that the meter capacity compensating features of my invention may be applied for operation with meters of various types and constructions; and also that the manual and automatic adjustment features may be changed as to construction, position and arrangement. For these reasons it should therefore be understood that the forms of the invention herein illustrated and described are intended to be illusrative of the invention only and not as limiting the scope thereof.

I claim:

1. In a fluid meter, a casing having a chamber with inlet and outlet openings, means including a rotor and a plurality of cooperating members movable relative thereto to form pockets for measured delivery of fluid between said inlet and outlet openings, and means for varying the volume of fluid delivered for a given metering operation comprising an element movable into and out of at least one of the pockets formed by said rotor and said members during a given cycle of operation of said meter to increase or decrease the effective capacity thereof.

2. In a fluid meter, a casing having a chamber with inlet and outlet openings, means including a rotor and a plurality of cooperating members movable relative thereto to form pockets for measured delivery of fluid between said inlet and outlet openings, means for varying the volume of fluid delivered for a given metering operation, comprising a piston-like element reciprocatable in timed relation to the rotations of said rotor into and out of at least one of the pockets formed by two of said members to increase or decrease the effective capacity thereof, and means for varying the extent to which said element is adapted to move.

3. In a fluid meter, a casing having a chamber with inlet and outlet openings, means including a rotor and a plurality of cooperating members movable relative thereto to form pockets for measured delivery of fluid between said inlet and outlet openings, means for varying the volume of fluid delivered for a given metering operation, comprising an element movable into and out of at least one of the pockets formed by said rotor and said members during a given cycle of operation of the meter to increase or decrease the effective capacity thereof, and means operative in response to the temperature of the fluid being measured to vary the extent of movement of said element so as to compensate for volumetric changes in the fluid due to changes in temperature thereof above or below a predetermined standard.

4. In a fluid meter, a casing having a chamber with inlet and outlet openings, means including a rotor and a plurality of cooperating members movable relative thereto to form pockets for measured delivery of fluid between said inlet and outlet openings, means for varying the volume of fluid delivered for a given metering operation comprising an element movable in timed relation to the rotations of said rotor into and out of at least one of the pockets formed between two of said members during said metering operation, means operative in response to the temperature of the fluid being measured to vary the movement of said element so as to compensate for volumetric changes in the fluid due to changes in temperature above and below a selected temperature, and means for adjusting said temperature responsive means for fluids having different coefficients of expansion.

5. In a fluid meter, a casing having a chamber with inlet and outlet openings, a rotor located in said chamber and provided with members operative to form enclosed spaces or pockets for measured delivery of fluid between said inlet and outlet openings, means for varying the capacity of the space or pocket formed between at least two of said members comprising an element revolvable with said rotor and movable relative to said rotor to positions into or out of said space or pocket during the formation thereof, and means for determining the extent of the movement of said element relative to said rotor.

6. In a fluid meter, a casing having a chamber with inlet and outlet openings, a rotor located in said chamber and provided with members operative to form pockets for measured delivery of fluid between said inlet and outlet openings, and means for determining the capacity of the meter for a given metering operation comprising an element revolvable with said rotor and movable relative to said rotor to positions inwardly and outwardly of said rotor and in association with at least one of the pockets formed between said members during said metering operation.

7. In a fluid meter, a casing having a chamber with inlet and outlet openings, a rotor located in said chamber and provided with members operative to form pockets for measured delivery of fluid between said inlet and outlet openings, and means for determining the capacity of the meter during a given metering operation comprising an element revolvable with said rotor and movable relative to said rotor to positions inwardly and outwardly of said rotor and in association with at least one of the pockets formed between said members during said metering operation, an eccentric controlling the positioning of said element during rotation of said rotor, and means for varying the eccentricity of said eccentric to change the capacity of the meter.

8. In a fluid meter, a casing having a chamber with inlet and outlet openings, a rotor located in said chamber and provided with members operative to form pockets for measured delivery of fluid between said inlet and outlet openings, an element located between a pair of said members and revolvable with said members and movable relative to said rotor to positions inwardly and outwardly of said rotor to determine the capacity of the pocket formed between said pair of members, a device having a cylindrical surface adjustable eccentrically with respect to the axis of said rotor, and means operatively associated with said surface during rotation of said rotor to control the positioning of said element relative to said rotor.

9. In a fluid meter, a casing having a chamber with inlet and outlet openings, a rotor located in said chamber and provided with members operative to form pockets for measured delivery of fluid, an element revolvable with said rotor and movable relative to said rotor to positions inwardly and outwardly of said rotor to vary the capacity of at least one of the pockets formed between said members, a device having a cylindrical surface adjustable eccentrically with respect to the axis of said rotor, means operatively associated with said surface during rotation of said rotor to control the positioning of said element relative to said rotor, and means responsive to change in temperature of the fluid being measured to vary the eccentricity of said device.

10. In a fluid meter, a casing having a chamber with inlet and outlet openings, a rotor located in said chamber and provided with members operative to form pockets for measured delivery of fluid, an element revolvable with said rotor and movable relative to said rotor to positions inwardly and outwardly of said rotor to determine the capacity of at least one of the pockets formed between said members, a device having a cylindrical surface adjustable eccentrically with respect to the axis of said rotor, means operatively associated with said surface during rotation of said rotor to control the positioning of said element relative to said rotor, temperature responsive means including a Sylphon bellows and mechanism operatively connecting said bellows to said device to vary the eccentricity thereof in accordance with the temperature of the fluid being measured, and means for setting said temperature responsive means in accordance to the coefficient of expansion of the fluid being measured.

11. In a fluid meter, a casing having a chamber with inlet and outlet openings, a rotor located in said chamber and provided with members operative to form pockets for measured delivery of fluid, an element revolvable with said rotor and movable relative to said rotor to positions inwardly and outwardly of said rotor to determine the capacity of at least one of the pockets formed between said members, a device having a cylindrical surface adapted for adjustment eccentrically with respect to the axis of said rotor, means cooperative with said surface during rotation of said rotor to control the movement of said element relative to said rotor, a shaft threadably connected to said device, means for maintaining said shaft against axial movement, and means for manually turning said shaft to adjust the eccentricity of said device.

12. In a fluid meter comprising a casing having a chamber with inlet and outlet openings, a rotor located in said chamber in sealing relation with a portion of the walls of the chamber and spaced from another portion of said walls to provide a passage for the fluid to be measured, members revolvable with said rotor and movable relative thereto into and out of sealing relation with that portion of the walls of said chamber from which said rotor is spaced to provide pockets for measured delivery of fluid; the combination therewith of means for varying the volume of fluid delivered by the meter per rotation of said rotor, which comprises an element revolvable with said rotor and movable inwardly and outwardly thereof in association with at least one of the pockets formed during each rotation of said rotor, and means for varying the extent of movement of said element.

13. In a fluid meter comprising a casing having a chamber with inlet and outlet openings, a rotor located in said chamber in sealing relation with a portion of the walls of the chamber and spaced from another portion of said walls to provide a passage for the fluid to be measured, members revolvable with said rotor and movable relative thereto into and out of sealing relation with that portiton of the walls of said chamber from which said rotor is spaced to provide pockets for measured delivery of fluid; the combination therewith of means for varying the volume of fluid delivered by the meter per rotation of said rotor, which comprises an element revolvable with said rotor and movable inwardly from the periphery thereof to provide an adjustable fluid return pocket as said element moves past the wall portion which is in sealed relation with said rotor, and means for varying the extent of movement of said element with respect to said rotor.

14. In a fluid meter comprising a casing having a chamber with inlet and outlet openings, a rotor located in said chamber in sealing relation with a portion of the walls of the chamber and spaced from another portion of said walls to provide a passage for the fluid to be measured, members revolvable with said rotor and movable relative thereto into and out of sealing relation with that portion of the walls of said chamber from which said rotor is spaced to provide pockets for measured delivery of fluid; the combination therewith of means for varying the volume of fluid delivered by the meter per rotation of said rotor, which includes said rotor being provided with an opening extending inwardly from the periphery thereof, a piston operatively movable in said opening inwardly and outwardly of said rotor, an eccentric and means cooperating with said eccentric to control the positioning of said piston outwardly of said rotor during movement from said inlet to said outlet and inwardly of said rotor during movement from said outlet to said inlet.

15. In a fluid meter comprising a casing having a chamber with inlet and outlet openings, a rotor located in said chamber in sealing relation with a portion of the walls of the chamber and spaced from another portion of said walls to provide a passage for the fluid to be measured, members revolvable with said rotor and movable relative thereto into and out of sealing relation with that portion of the walls of said chamber from which said rotor is spaced to provide pockets for measured delivery of fluid; the combination therewith of a plurality of pistons each disposed for movement radially of said rotor, a device having a cylindrical surface mounted for adjustment eccentrically with respect to the axis of said rotor, means for maintaining said pistons in operative association with the surface of said device, and means operable for adjusting the eccentricity of said device to determine the extent of movement of said pistons.

16. In a rotary fluid meter, a casing having a chamber with inlet and outlet openings, a rotary element having a plurality of vanes movable relative thereto to form pockets for measured delivery of fluid between said inlet and outlet openings, and means including a member carried by said rotary element and movable relative thereto during rotation of the element for varying the effective capacity of at least one of the pockets formed between two of said vanes during a cycle of operation.

17. In a rotary fluid meter, a casing having a chamber with inlet and outlet openings, a rotary element having a plurality of members movable relative thereto to form pockets therebetween for measured delivery of fluid between said inlet and outlet openings, and means including a piston carried by said rotary element and movable relative thereto and disposed between two of said members to vary the effective capacity of the meter by returning a portion of the measured fluid from the outlet to the inlet sides of the meter.

18. In a rotary meter, a casing having a chamber with inlet and outlet openings, a rotary element in said chamber and having at least one opening extending inwardly from the periphery thereof, the peripheral portions adjacent the opening being adapted to engage the casing between the inlet and outlet openings so that a predetermined amount of liquid can be transferred by said opening from one to the other of said inlet and outlet openings, a piston movable in said opening, and means to vary the extent of movement of said piston with respect to the periphery of the rotor to vary the amount of liquid transferred by said opening during rotation of said rotor.

19. In a rotary meter, a casing having a chamber with inlet and outlet openings, a rotary element in said chamber and having at least one opening extending inwardly from the periphery thereof, the peripheral portions adjacent the opening being adapted to engage the casing between the inlet and outlet openings so that a predetermined amount of liquid can be transferred by said opening from one to the other of said inlet and outlet openings, a piston movable in said opening, a member having a surface eccentrically located with respect to the axis of said rotary element, means engaging said surface and connected to said piston to vary the movement of said piston as said element rotates, and means to vary the position of said member to vary the amount of liquid transferred by said opening during rotation of said rotor.

CHARLES S. HAZARD.